July 5, 1966  R. CHAPMAN  3,259,417
SUCTION HEAD FOR TRANSPORTING VENEER SHEETS
Filed Aug. 7, 1961  8 Sheets-Sheet 1

INVENTOR.
RALPH CHAPMAN
BY
BUCKHORN, CHEATHAM & BLORE
ATTORNEYS

July 5, 1966  R. CHAPMAN  3,259,417
SUCTION HEAD FOR TRANSPORTING VENEER SHEETS
Filed Aug. 7, 1961  8 Sheets-Sheet 2

INVENTOR.
RALPH CHAPMAN
BY
BUCKHORN, CHEATHAM & BLORE
ATTORNEYS

INVENTOR.
RALPH CHAPMAN
BY
BUCKHORN, CHEATHAM & BLORE
ATTORNEYS

July 5, 1966  R. CHAPMAN  3,259,417
SUCTION HEAD FOR TRANSPORTING VENEER SHEETS
Filed Aug. 7, 1961  8 Sheets-Sheet 4

INVENTOR.
RALPH CHAPMAN
BY
BUCKHORN, CHEATHAM & BLORE
ATTORNEYS

INVENTOR.
RALPH CHAPMAN
BY
BUCKHORN, CHEATHAM & BLORE
ATTORNEYS

July 5, 1966     R. CHAPMAN     3,259,417
SUCTION HEAD FOR TRANSPORTING VENEER SHEETS
Filed Aug. 7, 1961     8 Sheets-Sheet 6

INVENTOR.
RALPH CHAPMAN
BY
BUCKHORN, CHEATHAM & BLORE
ATTORNEYS

July 5, 1966  R. CHAPMAN  3,259,417
SUCTION HEAD FOR TRANSPORTING VENEER SHEETS
Filed Aug. 7, 1961  8 Sheets-Sheet 7

INVENTOR.
RALPH CHAPMAN
BY
BUCKHORN, CHEATHAM & BLORE
ATTORNEYS

July 5, 1966 R. CHAPMAN 3,259,417
SUCTION HEAD FOR TRANSPORTING VENEER SHEETS
Filed Aug. 7, 1961 8 Sheets-Sheet 8

INVENTOR.
RALPH CHAPMAN
BY
BUCKHORN, CHEATHAM & BLORE
ATTORNEYS

United States Patent Office 3,259,417
Patented July 5, 1966

3,259,417
SUCTION HEAD FOR TRANSPORTING
VENEER SHEETS
Ralph Chapman, Corvallis, Oreg., assignor to Wood
Processes, Oregon, Ltd., Corvallis, Oreg., a limited partnership of Oregon
Filed Aug. 7, 1961, Ser. No. 129,601
7 Claims. (Cl. 294—64)

My present invention comprises a machine and method for forming plywood, wherein the majority of the operations are performed automatically by mechanical means rather than by the manual operations of the prior art. The invention particularly embodies means for forming covered plywood having surface skins of consolidated fibers as formed by the methods claimed in my Patent No. 2,992,152, issued July 11, 1961, and my copending application Serial No. 697,030, filed November 18, 1957, now Patent No. 3,011,938. Reference may also be made to my Patent No. 2,947,654, issued August 2, 1960. The apparatus and methods are also practical for the formation of plywood not having the surface skins thereon, it being possible merely by halting the operation mechanism employed to create moist fiber webs from which the consolidated skins are formed, and of the adhesive supplying means therefore, without any other alteration to the mechanism and without altering the method of laying up and consolidating the plywood. Veneer assemblies, with or without surface skins, laid up in accordance with the present method on the machinery of the present invention are adapted to be formed into consolidated sheets in a stack press such as disclosed and claimed in my copending applications Serial No. 21,471, filed April 11, 1960, now Patent No. 3,061,878, and Serial No. 46,554, filed August 1, 1960, now Patent No. 3,126,578, in accordance with the method disclosed and claimed in the latter application Serial No. 46,554.

Reference is here made to my United States Patent 3,126,578 disclosing and claiming a powdered adhesive applicating mechanism useful with the present invention.

A principal object of the present invention is to provide a machine and method for automatically laying up plywood, with or without fiber covers.

A further object of the present invention is to provide means and a method for forming plywood from moist veneer sheets immediately after they are sliced from logs. An advantage of the present invention is that the heretofore necessary step of drying the veneer sheets is eliminated, thereby eliminating large, expensive, and expensive to operate, drying ovens and oven feeders, and eliminating a number of handling operations heretofore required between the veneer sheet forming steps and the plywood layup steps. The cost of plywood is thereby materially reduced since the machinery, plant space for machinery and stock piles, and labor heretofore required for drying the veneer sheets are eliminated. Plywood may be made in accordance with my invention at materially less cost than by prior processes.

A further object of the present invention is to provide a machine and method for forming plywood utilizing moist (green) veneer sheets. An advantage of the present invention is that veneer sheets, when in their wet or "green" state, naturally lie flat and stack into compact piles, thereby eliminating equipment and manual supervision heretofore required to maintain dried veneer sheets, which are usually warped, in edge-to-edge abutment with each other. In practicing the present invention, barring an occasional mishap, all sheets of plywood turned out have all plies continuous, rather than having wide gaps in some of the plies as is customary in normal plywood manufacture. This means that practically all of the output of the plant passes the requirements for best quality insofar as the presence or absence of gaps is concerned.

A further advantage of the present invention is that poor quality veneer sheets may be utilized in the interior plies of plywood of good quality on one or both faces, since "pecky" logs having specks, pockets, numerous knots, wormholes or rotten streaks may be utilized for the interior plies or back face, and, if not too bad, even for both faces when covered by fiber surfacing. Such utilization is possible since a moist sheet of veneer in its green state will hold together during the layup of the plywood, whereas such poor quality veneer, when dried in accordance with prior practice, usually splits or crumbles in places, and knots fall out. Plywood made in accordance with my present invention, utilizing such poor quality veneer sheets, usually has the strength and other qualities required for top grade plywood.

A further object of the present invention is to provide a new and novel means and method of forming plywood wherein powdered adhesives may be employed. The present invention makes possible the utilization of a wide range of adhesives which could not be economically or practically employed in plywood manufacture in accordance with prior art processes. If viscous, flowable adhesives are employed they are usually mixed with a solvent or liquid carrier as required, thus requiring mixing equipment and handling operations, and frequent servicing and cleaning of the equipment is required in order to keep the adhesive constantly flowing when desired and to prevent hardening in place during shutdowns. If dried sheets of adhesive, or dried adhesive films, are employed, the same are expensive whether manufactured at the plant or purchased from outside sources. The present invention enables the utilization of any powdered adhesive capable of being set under heat and pressure, the adhesive handling mechanism remains constantly clean, shutdowns may occur without requiring clean-up of the mechanism, and rapid, easy changeover from one type of adhesive to another as desired for certain different qualities of plywood is made possible.

An advantage of the present invention is that the formation of plywood from which interior strains have been eliminated so that the plywood has little, if any, tendency to warp, is made possible in a practical, economical manner.

A further advantage of the present invention is that fiber surfaced plywood may be made at less expense than ordinary plywood made by conventional methods, which results in a further saving since the equipment and labor of sandpapering the surfaces are eliminated.

A further object of the present invention is to provide a method and machine for laying up plywood, with or without surface skins of dense consolidated fibers, utilizing either dry or moist flitches of veneer. Portions of the present apparatus are designed to operate most satisfactorily with moist and therefore relatively smooth and unwrinkled sheets of veneer as they come from a veneer cutting machine. However, the same apparatus may be utilized in the formation of plywood using air or kiln dried veneer sheets, provided some discrimination is used in rejecting badly curled or split sheets. In other words, the present apparatus may be utilized in whole or in part to form plywood without relying upon the presence of sufficient moisture therein to plasticize a dry powdered adhesive. In such case each adhesive applying mechanism, if designed to apply a film of dry powder, could be operated in conjunction with means to apply a plasticizing liquid such as water to each successive layer of material either before or after applying the powder thereto. The application of water is not necessary with phenolformaldehyde resins and others which are plasticized by heat alone, being necessary only for protein adhesives. Portions of the present apparatus, such as vacuum pickup and transfer means for the layers of veneer, are perfectly adapted to operate with dry veneer sheets, so that in effect the present invention comprises means and method for forming plywood, with or without fiber covers, utilizing veneer sheets in any stage of moisture content, and utilizing any type of powdered adhesive capable of setting under heat and pressure.

The objects and advantages of the present invention may be more readily understood by reference to the accompanying drawings, taken in connection with the following specification, wherein like numerals refer to like parts throughout, and in which a preferred form of the present invention is illustrated and described.

The entire machine

The machine herein disclosed includes a stack press 50 of the type disclosed and claimed in the above-identified applications Serial No. 21,471 and 46,554, in which a plurality of assemblies of veneer sheets and covering webs of fiber are individually placed between platens progressing upwardly in a stack and heated by blowing hot air, hot gasses or flame through passages therein, each platen supporting a caul plate 52 thereon and on which the material is positioned, and each platen preferably having a caul plate on its lower surface whereby smooth, parallel sides are imparted to the finished article. The platens individually enter the press at the bottom of the press. The number of platens in the press depends upon machine design, operation requirements, the length of time required to dry the moist material and set the adhesive for holding the plies together, and such other related factors, and there is one platen in excess of the number in the stack press. The platens are sequentially ejected from the stack press at the top and lowered on the deck 54 of an elevator including a piston 56 operating in a deep well cylinder to the level of the bottom of the press and adjoining conveyors such as indicated at 58 and 60, each ejected platen supporting a caul plate and a consolidated sheet. A newly laid up assembly of material resting upon a caul plate is fed onto the hot platen which remains on the conveyor deck 54 while the previous caul plate and finished sheet are removed, the hot platen and fresh material thereon being then placed in the stack. The ejected caul plate is carried away by conveyor 60 and presented to means 62 for removing the consolidated sheet from the caul plate, cooling a plurality of sheets, and stacking them as disclosed in the above-identified concurrently filed application Serial No. 46,554, now patent No. 3,126,578. The caul plate is then placed on a return conveyor 64 by means including a hydraulic elevator 66 which lowers the caul plate from the height of the conveyor 60 to the level of the conveyor 64. The caul plates are returned to the beginning end of the layup machine and are elevated by a hydraulic elevator 68 and placed upon the layup machine conveyor 70 which progresses the caul plate through the layup mechanism and returns it, bearing a finished assembly of material, to the conveyor 58. There are quite a few caul plates in excess of those in the stack.

The conveyor 70 comprises a plurality of endless chains 72 supported upon rails 74 (FIG. 25) and moving at a regulated, constant speed, the chains being provided at suitable intervals with upwardly projecting lugs 76 adapted to engage the rear edges of the caul plates 52 and progress them through the machine. Each caul plate 52 is substantially abuted against the trailing edges of the lugs 76 so that a substantially continuous ribbon of caul plates 52 progresses through the machine, there being only a narrow slot between adjacent edges of each pair of caul plates.

Figure 1:
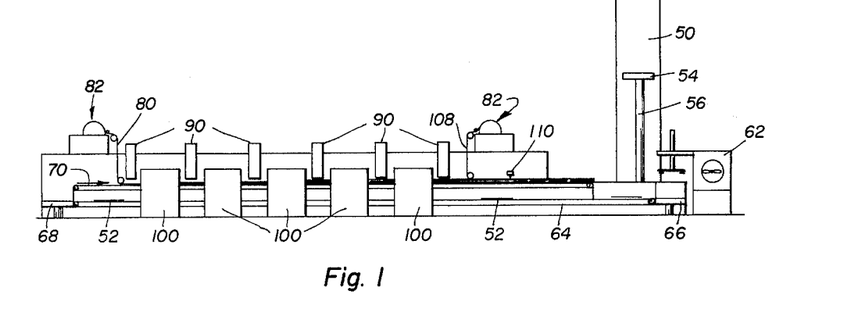
FIG. 1 is a view, in side elevation, of a schematic representation of a plywood plant embodying the present invention.
Figure 2:
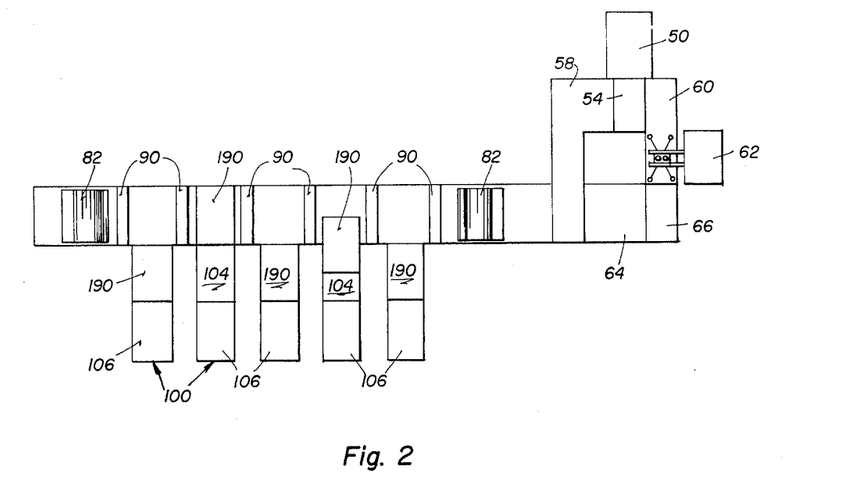
FIG. 2 is a plan view of FIG. 1.
Figure 3:
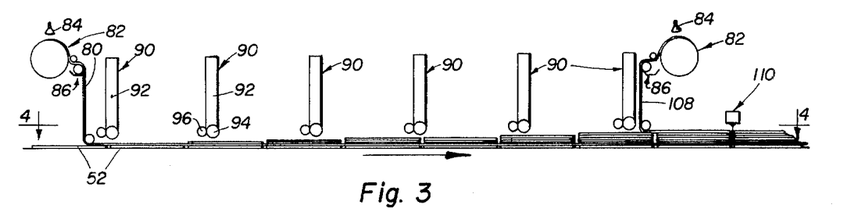
FIG. 3 is a schematic representation, in side elevation, of the layup apparatus of the present invention.
Figure 4:
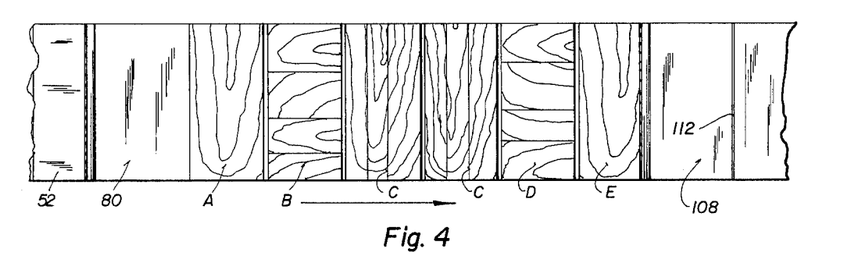
FIG. 4 is a horizontal section taken substantially along line 4—4 of FIG. 3.

A first endless, moist web 80 of interlaced fibers is formed on a cylinder machine 82 and continuously laid onto the upper surfaces of the traveling caul plates, the web being preferably partially dried by infrared heating means 84 (FIG. 3) and impregnated with a drying oil (which may have a pigment therein) by an applicator device 86, as more fully set forth in the above-identified application Serial No. 697,030. The drying oil is applied to the screen side of the web which is relatively smooth, and the wrinkled outer side of the web lies uppermost on the caul plates 52. The oil penetrates the web and forms a barrier therein against the expression therethrough of fluids exuded from the veneer sheets in the pressing operation, thereby preventing the formation of discoloring blotches on the surfaces of the fiber skins. The oil also serves as a parting compound to permit removal of the consolidated sheet from the caul plate, and also serves as a tempering medium to lessen moisture absorption through the surfaces of the finished sheet while in storage and in its place of ultimate use. The finished fiber surfaces are dense, smooth, unblemished, and do not permit grain raising when the sheet is painted or stained.

After the first web is laid onto the constantly moving string of caul plates, it passes beneath a first powder applicator 90, of the type disclosed and claimed in the above-identified concurrently filed application Serial No. 46,554, now Patent No. 3,126,578. The powder applicator includes a vertically walled bin 92 in which a powdered adhesive may be stored, a metering cylinder 94 adapted to withdraw metered amounts of the adhesive from the bottom of the bin, and an oppositely revolving brush 96 which engages the emerging surface of the metering cylinder and is provided with numerous bristles which engage the adhesive and flip it onto the surface of the traveling web by reason of the brush rotating at a higher speed than the cylinder. The brush is at the oncoming side of the traveling web so that the thin film of adhesive powder spread onto the web by the applicator has sufficient time to absorb moisture from the web before the next operation in the process occurs, the adhesive being undisturbed while in relatively loose, dry condition on the web and until it has had time to adhere to the web by becoming slightly moistened.

A first face ply A of moist veneer is then placed upon the web by automatic means to be described, being so positioned as to be superimposed upon and centered with respect to one of the caul plates 52. As is usual, the face ply has its grain running longitudinally of the plywood and may comprise a single piece of veneer, or an edge stitched sheet composed of smaller skiffs, or may be composed of smaller skiffs merely placed in edge-to-edge abutting relationship to each other in the layup machine as will be described. The placing of the face ply is accomplished by means including a first layup mechanism 100, which includes means to withdraw a single ply from a magazine 102 (FIG. 5) positioned upon a magazine conveyor table 104.

A thin film of a powdered adhesive is then dusted upon ply A by a second powder applicator 90 as previously described, whereby the inner surface of the face sheet is provided with a thin film of adhesive adapted to secure the next ply thereto. The next ply B is then placed upon the ply A in vertical alignment therewith by a succeeding layup mechanism 100 after sufficient time has elapsed for the adhesive to absorb moisture and thus firmly adhere to ply A, the only difference being that the magazines therein employed, and the positioning means thereof, are modified to handle crossband veneer. Similarly, a successive skiff ply C, a crossband ply D and a face ply E are superimposed upon each other and dusted with an adhesive powder as previously described, to form a veneer core. After the upper face ply E is provided with adhesive, a second wet web 108 of interlaced fibers is positoned upon the core as an endless ribbon, the web being formed and impregnated with a drying oil as previously described. As a last step in the layup operation, the webs 80 and 108 are severed by a flying shear mechanism 110 which conveniently comprises a transverse conduit, provided with a line of downwardly facing, closely spaced jet nozzles, and into which water is conducted under pressure. The conduit is moved longitudinally at the speed of the conveyor while it is transversely shifted until the openings made by the jets join as continuous cuts 112 severing both webs, whereby the assemblies of material supported on individual caul plates and platens may be introduced to the press.

I have herein illustrated the formation of a five-ply, fiber-surfaced plywood sheet. The same mechanism may be utilized for manufacturing three-ply, fiber-surfaced plywood by halting the operation of the fourth and fifth veneer laying equipment and the operation of the fourth and fifth adhesive applicators. Similarly, plywood having more plies may be formed in the same manner by increasing the number of veneer laying machines and adhesive applicators in the plant. It is also to be appreciated that the same equipment may be used to manufacture ordinary plywood merely by halting the operation of the web forming equipment, the first and last powder applicators, and the web severing mechanism.

During the travel of the caul plates through the layup machines the end edges thereof are engaged in guide means at the sides of the conveyor 70 so as to hold the caul plates to the conveyor chains and in common plane. The guide means includes lower angle bars 112 mounted upon longitudinal frame members 114, the upper horizontal legs of which support the edges of the caul plates. Guide strips 116, slightly thicker than the thickness of the caul plates, guide the end edges of the caul plates, and cap strips 118 mounted on the frame members overhang the end edge portions of the caul plates.

The elements going into the makeup of the finished sheet are so proportioned, and the equipment handling the elements is likewise so proportioned, as to allow for trimming of the finished sheet. For example, in the manufacture of a plywood sheet four feet wide by eight feet long the skiffs are about one hundred inches long so as to permit a two inch trim at each end, and each ply is about fifty inches wide so as to allow for trimming one inch at each side. The caul plates are about one hundred and six inches long by fifty-three inches wide. The webs 80 and 108 are about one hundred and two inches wide so that they overhang the assembled cores along all four edges.

The adhesive employed may vary in many respects, having in common only that they are essentially dry powders capable of setting under heat and pressure. Such adhesives include soybean flour, blood albumin, powdered animal glues, powdered casein glues, powdered phenol formaldehyde, or urea formaldehyde resins or other synthetic resins, and the like. They may be very fine or somewhat coarse, and in some cases may be slightly sticky and tend to flock. The tendency to flock may be increased by incorporating therein powdered paraffin or spraying thereonto or mixing therewith a slight percentage of a liquid paraffin or other flocculating substance. As long as the powder has the capacity to be brushed from the cylinder by the rotating brush, it will operate in the present invention. One type of adhesive may be used at the surfaces of the core and another in the interior. The powder may comprise a mixture of different types of adhesive and may have mixed therewith other substances such as waterproofing substances, fungicides, vermicides, flameproofing materials and the like.

*The magazines*

The veneer sheet magazines 102 are illustrated in FIGS. 6 to 11 inclusive, a skiff or longitudinal ply magazine for plies A, C and E being illustrated in FIGS. 6 to 10, inclusive. This magazine comprises a pallet 120 built up of structural steel members and including a floor plate 122 and longitudinally extending bottom channel bars 124 adapted to support the magazine on a floor or elevator deck, the webs of these channel members being lowermost. The channel members 124 are interrupted by a pair of transverse, inverted channel members 126 adapted to receive the tines of a lift fork truck. Mounted upon the ends of the pallet are a pair of end wall structures 128 including upper angle bars 130 each having one leg turned horizontally inward. Pivotally mounted upright in the end walls 128 are a plurality of angle bar dividers 132. Each angle bar divider is provided with an upper, laterally extending arm 134 from which a pintle 136 projects upwardly through a pivot opening in the angle bar 130. Each angle bar divider is also provided with a parallel, lower laterally projecting arm 138 from which downwardly projects a pintle 140 extending through a pivot opening in the floor of the pallet. The arm 138 also carries a shorter, positioning pin 142 which extends downwardly therefrom. The spacing between the outer surfaces of the arms 134 and 138 is such that the divider may be lifted vertically to disengage the pin 142 from its selected opening, without disengaging the pintles from their pivot openings. The floor of the pallet is provided with a pin receiving opening 144 in lateral alignment with the pintle 140 and a second pin receiving opening 146 in longitudinal alignment with the pintle 140. The arrangement is such that the divider may be rapidly flipped from a dividing position in which one leg extends longitudinally toward the opposite end of the magazines, to a position in which both legs are positioned beneath the angle bar 130, the divider in this relationship acting as an abutment to prevent the skiffs from sliding beneath the angle bars 130.

The pivotal axes of the divider bars are so arranged that the interior of the magazine may be subdivided into a plurality of compartments of different sizes forming multiples of each other. For example, in forming a ply which is fifty inches wide, the dividers may be so set as to accommodate a first pile of skiffs 150 six and one-quarter inches wide, a second pile of skiffs 152 also six and one-quarter inches wide, a third pile of skiffs 154 twelve and one-half inches wide, and a fourth pile of skiffs 156 twenty-five inches wide, the four piles being separated about three-eighths to one-half of an inch from each other. The outer corners of the outer piles of skiffs are engaged by fixed angle bars 158 at the corners of the pallets. Any combination of widths of skiffs may be thus accommodated, for example eight piles of skiffs six and one-quarter inches wide, four piles of skiffs twelve and one-half inches wide, or two piles of skiffs twenty-five inches wide, or all of the dividers may be flipped out of the way so that the magazine will accommodate a pile of complete sheets fifty inches wide.

The same type of arrangement is utilized in magazines 102A (FIG. 11) designed to accommodate crossband veneers, in which case the angle bars 130A pivotally mount a plurality of dividers 132 so arranged as to accommodate skiffs having widths of any suitable fraction of the length of the ply being formed, with the magazine designed to accommodate crossbands fifty inches in length.

Magazine handling

In FIGS. 5 and 12 to 21, inclusive, the loading of magazines into the machine and the removal therefrom for refilling is illustrated.

Figure 5:
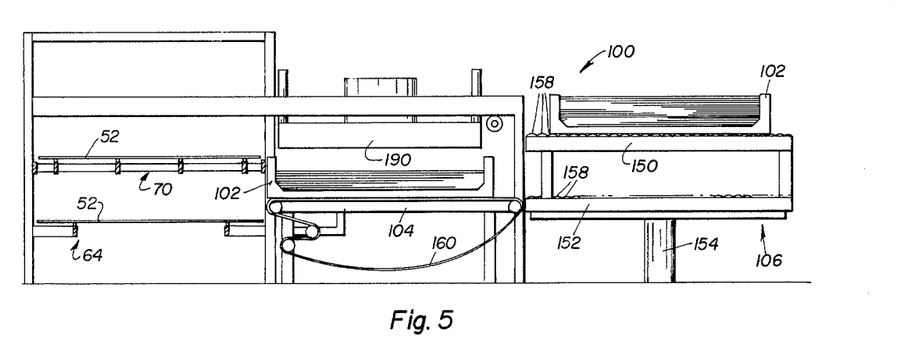
FIG. 5 is a somewhat schematic representation of a typical cross-section through the layup apparatus.
Figure 6:
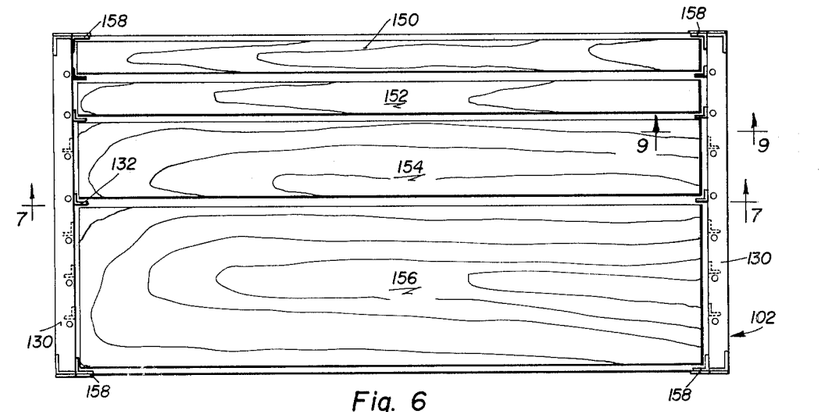
FIG. 6 is a plan view of a veneer sheet magazine used in the present invention, the magazine being employed in laying up the face plies of a sheet of plywood and other plies in which the grain runs in the long direction.
Figure 7:
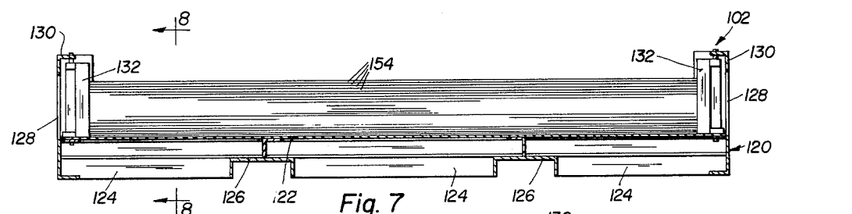
FIG. 7 is a vertical section taken substantially along line 7—7 of FIG. 6.
Figure 8:
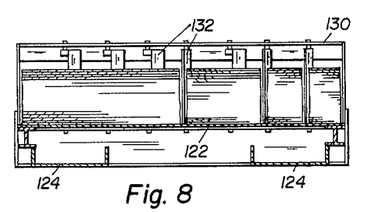
FIG. 8 is a vertical section taken substantially along line 8—8 of FIG. 7.
Figure 9:
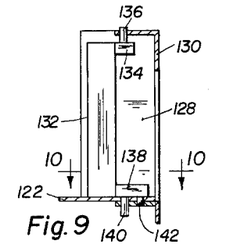
FIG. 9 is a partial vertical section taken substantially along line 9—9 of FIG. 6, on a larger scale.
Figure 10:
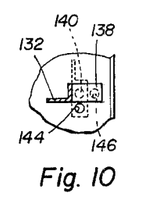
FIG. 10 is a horizontal section taken along line 10—10 of FIG. 9.
Figure 11:
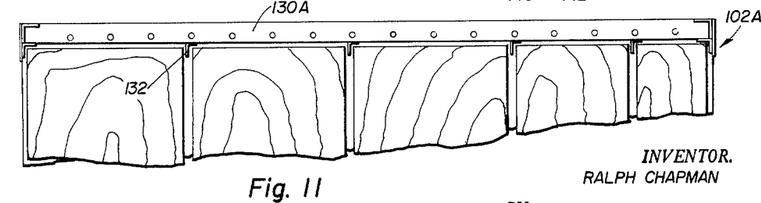
FIG. 11 is a partial plan view of a veneer sheet magazine of the type utilized for the crossband plies.
Figure 21:
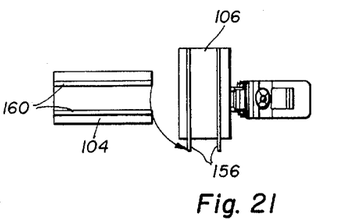

In FIG. 5 a loaded magazine 102 is illustrated as positioned upon the upper deck 150 of a two-level elevator 106, the lower deck 152 thereof being mounted at the upper end of a piston 154 mounted in a cylinder (not shown) sunk into the floor of the plant. The piston 154 is rotatable within its cylinder, so that an attendant may rotate the elevator 106 from a position in longitudinal alignment with the magazine loading conveyor 104 (FIG. 20) to a position at right angles thereto (FIG. 21). Each deck of the elevator is provided with a pair of longitudinally extending tracks 156 extending beyond the elevator deck at the end thereof which is adapted to be moved into alignment with the magazine loading conveyor 104, and each track having a plurality of rollers 158 projecting above the surface thereof. The tracks are so arranged that the webs of the angle bars 124 may rest upon the rollers 158 whereby slight manual effort is required to move a magazine on either deck of the elevator. The magazine loading conveyor 104 comprises a spaced pair of endless chain belts 160 so arranged as to engage the webs of the angle bars 124 on the magazines, and adapted to be driven a suitable amount in either direction so as to move a magazine started onto the conveyor into position against a suitable abutment, as indicated in FIG. 5, or to remove the empty magazine and position it on one of the decks of the elevator 106.

Figure 12:
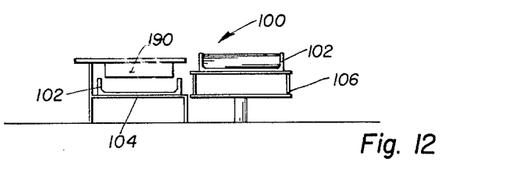
FIGS. 12 to 19, inclusive, are schematic views, in side elevation, showing the manner of handling and loading magazines into the layup machine and removing the magazines for refilling.
Figure 13:
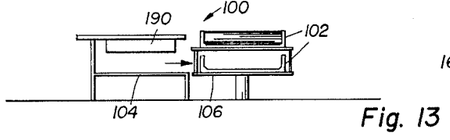
Figure 14:
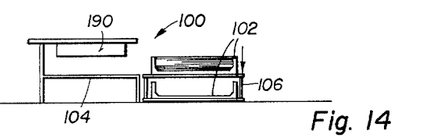
Figure 15:
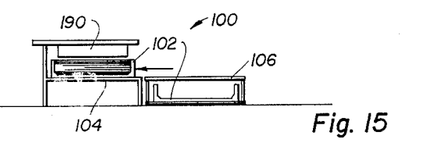
Figure 16:
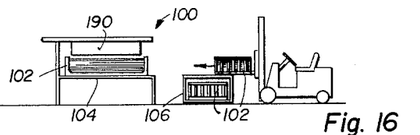
Figure 17:
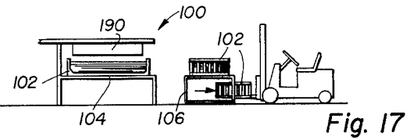
Figure 18:
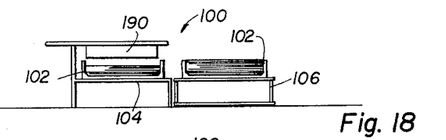
Figure 19:
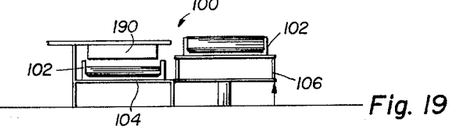
Figure 20:
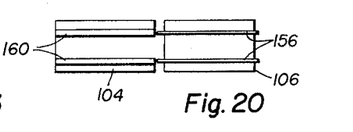
FIGS. 20 and 21 are schematic plan views showing steps in the handling of the magazines.

FIG. 12 shows a loaded magazine on the upper deck of the elevator and an empty magazine on the magazine loading conveyor. FIG. 13 shows the empty magazine removed and placed on the lower deck of the elevator. FIG. 14 shows the elevator lowered so as to place the loaded magazine at the level of the magazine loading conveyor. FIG. 15 shows the loaded magazine moved into position beneath a sheet transfer mechanism. FIG. 16 shows the elevator rotated ninety degrees to the position illustrated in FIG. 21 and a filled magazine being placed on the upper deck thereof by means of a fork lift truck. FIG. 17 shows the fork lift truck removing the empty magazine from the lower deck so that it may be refilled. FIG. 18 shows the elevator revolved so as to position the tracks in alignment with the conveyor belts, and FIG. 19 shows the elevator elevated and waiting for the emptying of the previously positioned magazine and the beginning of a new cycle as illustrated in FIGS. 12 to 19.

Transfer means

Figure 22:
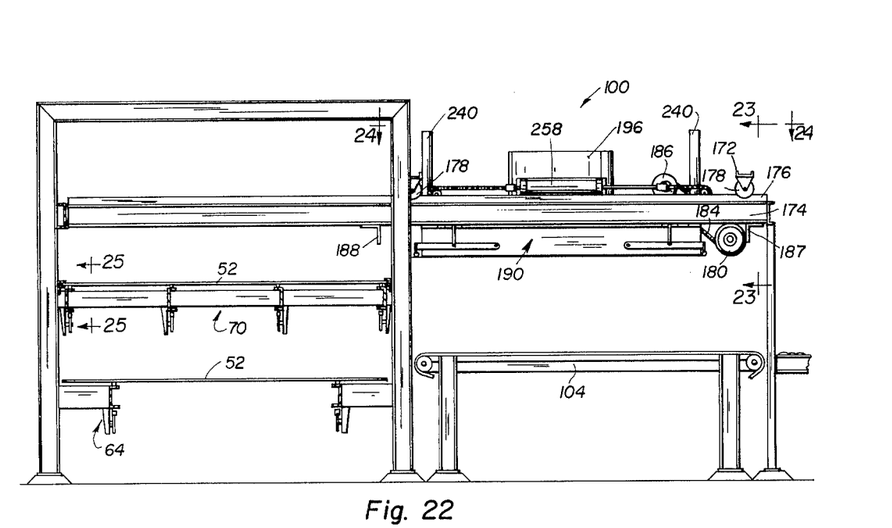
FIG. 22 is a side elevation, on an enlarged scale, of a portion of the apparatus illustrated in FIG. 5, showing the general arrangement of a suction box transfer mechanism.
Figures 23, 24, 25, 26:
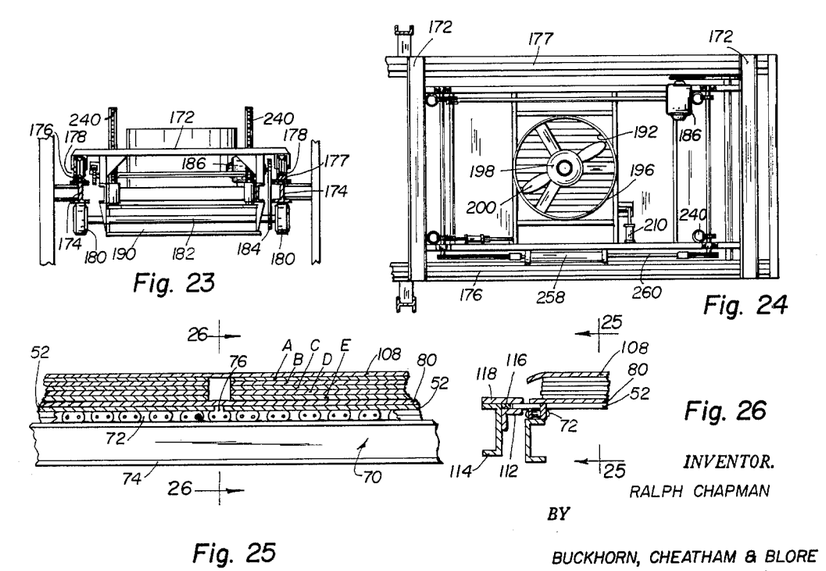
FIG. 23 is a vertical section taken substantially along line 23—23 of FIG. 22.
FIG. 24 is a horizontal section taken substantially along line 24—24 of FIG. 22.
FIG. 25 is a partial section, somewhat schematic, disclosing a detail of the conveyor mechanism of the layup machine and a formed assembly of materials, the view being taken along line 25—25 of FIGS. 22 and 26.
FIG. 26 is a vertical section taken substantially along line 26—26 of FIG. 25.
Figure 35:
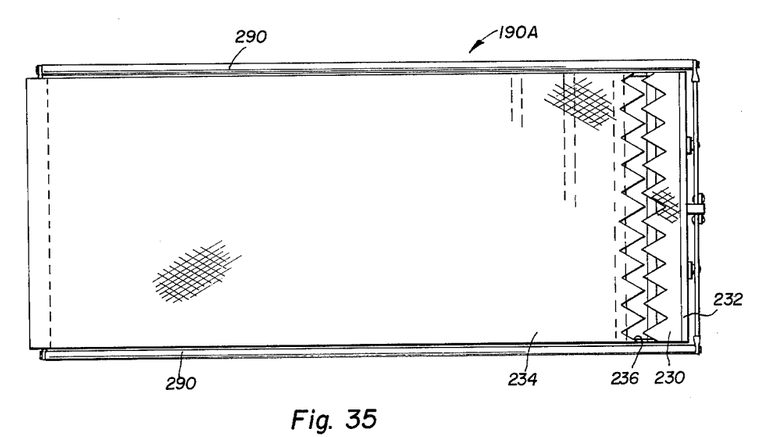
FIG. 35 is a view corresponding to FIG. 32, showing the lower wall of a suction box utilized for handling crossband veneer sheets.

The layup means transfer mechanism is illustrated in detail in FIGS. 22 to 24 inclusive, and FIGS. 27 to 35 inclusive. FIGS. 27 to 34, inclusive, give the details of a suction box adapted to handle and place the face plies or skiffs with the grain running longitudinally of the finished product, and FIG. 35 shows the operating face of a suction box adapted to handle and place crossbands with the grain running transversely of the finished product. The first form is adapted to place plies A, C and E and the second form of FIG. 35 is adapted to place plies B and D.

The mechanism includes a carriage built up of structural members including longitudinal channel bars 170 and elevated, transverse channel bars 172. The carriage reciprocates transversely with respect to the path of travel of the caul plates and the material thereon between track supporting H-bars 174 having their webs positioned vertically (FIG. 23). Means comprising an inverted angle bar 176, and a flat bar 177, fixed to the upper legs of the H-bars 174 provide tracks on which roll carriage supporting wheels 178 depending from the ends of the transverse bars 172. A pair of resiliently tired wheels 180 mounted on a transverse shaft 182 at the outer end of the carriage engage the lower arms of the H-bars 174 and are driven by sprocket chain means 184 and a motor 186. The motor is reversible and automatically controlled by means (not shown) sensing the gaps between the caul plates 52, being operative to roll the carriage outwardly until the wheels 180 engage an abutment 187, or inwardly until the wheels 180 engage an abutment 188. When the carriage is at its outer limit of movement it is vertically aligned with a magazine 102 positioned on the magazine conveyor table 104. When the carriage is at its inner position the mechanism is in position to place veneer sheets in proper position on the moving web 80 or previously positioned veneer layers.

Figure 31:
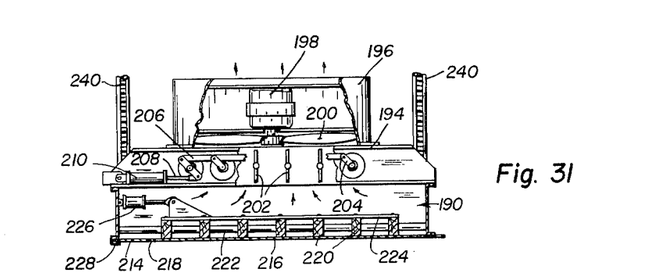
FIG. 31 is a partial vertical section taken substantially along line 31—31 of FIG. 27, with parts broken away for clarity.
Figure 32:
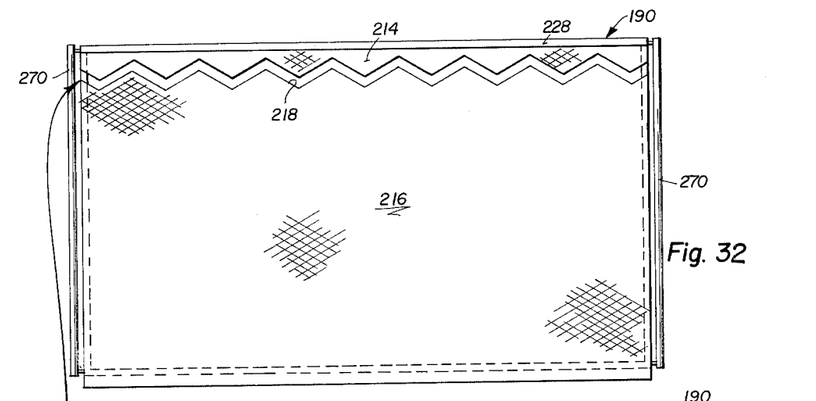
FIG. 32 is a view looking upward onto the lower, foraminous wall of the suction box of the transfer mechanism.

Mounted upon the carriage is a suction box 190 having imperforate side walls, and an upper wall in which there is provided a large, centrally disposed opening 192. Above the opening 192 there is mounted a damper cage 194 and a short, cylindrical, exhaust stack 196. Mounted on a spider within the exhaust stack there is a continuously operating motor 198 driving a propeller 200 in such direction as to exhaust air from the suction box 190 upwardly through the stack 196 so as to create a partial vacuum within the suction box. Mounted within the damper cage 194 are a plurality of damper vanes 202 connected to cranks 204, all of which cranks are connected to a laterally extending crank link 206. One of the cranks has a downwardly extending arm which is connected to a piston 208 extending from a cylinder 210 mounted on the suction box. The damper vanes may be moved into closed position, thereby preventing the flow of air through the suction box 190, or opened, as illustrated in FIG. 31. The propeller is constantly rotating, but the suction in the suction box 190 is intermittent as controlled by the position of the damper vanes 202.

The suction box is rectangular and has substantially the dimensions of the plies being laid up, less a few inches in one direction. Thus the suction box illustrated in FIG. 32, which is adapted to lay up the skiffs and face plies, is about fifty inches wide and about ninety-four inches long. Therefore, when one hundred inch skiffs or face plies are supported by the suction box, in symmetry therewith, the ends of the veneer sheets project beyond the suction box by about three inches at each end.

Figures 33, 34:
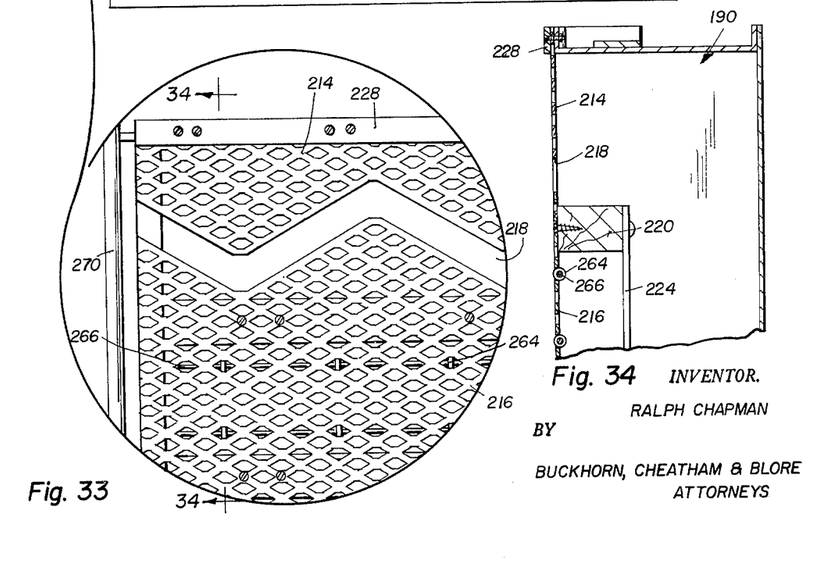
FIG. 33 is a detail view, on an enlarged scale, of FIG. 32 in the area indicated by the arrow leading to FIG. 32.
FIG. 34 is a vertical section taken substantially along line 34—34 of FIG. 33.

The lower, downwardly facing and horizontally disposed bottom wall of the suction box comprises a foraminous plate divided into a narrow, fixed portion 214 extending along one long edge of the suction box and a large, horizontally movable portion 216 covering the remainder of the downwardly open mouth of the suction box. As illustrated in FIGS. 33 and 34, the portions of the plate comprise sections of smooth-surfaced, expanded metal. The two portions are normally separated by an elongated, zigzag slot 218, the edges of the plates being parallel throughout so that the projections on the edge of one plate interfit with the depressions in the edge of the adjacent plate. The movable plate 216, when separated from the fixed plate to the maximum extent, as illustrated in FIG. 33, is so disposed that the projections on the opposite edges overlap whereby the edges of skiffs which may lie along the area of the slot are prevented from being bent inwardly by the suction. The movable plate 216 is supported by the edges of the suction box and by a movable interior frame comprising a plurality of beams 220 extending parallel to each other within the suction box and to which the plate is screwed. The beams are supported and guided for limited movement by transverse guide rods 222 extending through suitable openings in the beams and which are supported by the walls of the suction box, all of the beams being connected together by tie bars 224 so that the beams, tie bars and plate 216 form a rigid assembly. The assembly is movable laterally by a piston and cylinder device 226 mounted on one wall of the suction box, which is adapted to be extended or contracted in response to suitable control means (not shown). Abutment means comprising a longitudinal bar 228 extends along a longitudinal edge of the suction box adjacent the fixed lower wall portion 214, the bar projecting below the lower wall.

The crossband suction box 190A illustrated in FIG. 35 has essentially the same construction, it being about forty-six inches wide when handling veneer sheets fifty inches long. The surface of this suction box comprises a foraminous, lower, horizontally disposed wall including a fixed portion 230 which is relatively narrow and extends along one edge of the box adjacent an abutment bar 232. The larger, longitudinally movable portion 234 is mounted on an assembly which may be moved by a piston and cylinder (not shown) in the manner previously described, the two portions being normally separated by a slot 236 as previously described.

Figure 27:
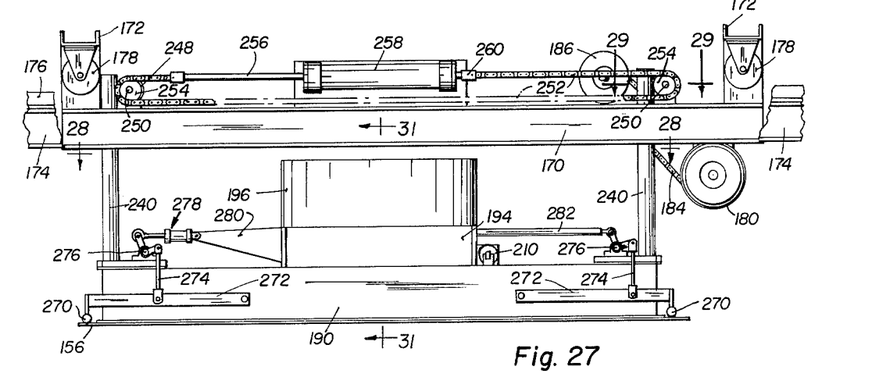
FIG. 27 is a side elevation, with parts broken away, of a portion of the apparatus illustrated in FIG. 22, on an enlarged scale, illustrating a step in the operation thereof.

Each suction box with its suction creating means mounted thereon may be reciprocated vertically toward and away from the carriage by means including a plurality of upright posts 240 located adjacent the corners of the box. Each post is cylindrical and is guided in a vertical sleeve 242 mounted on the carriage. Each post has a longitudinal keyway therein in which is mounted a rack 244, held in the keyway by screws 246, the rack engaging a pinion 248 mounted upon one of a pair of transversely extending shafts 250. A sprocket chain 252 is passed around sprockets 254 fixed to the ends of shafts 250, one end of the sprocket chain being connected to a piston rod 256 extending from one end of a double-acting cylinder 258 mounted on the carriage (FIG. 27), and the other end of the sprocket chain being connected to an oppositely directed piston rod 260 extending from the cylinder 258 (FIG. 24). The two piston rods are connected to the opposite faces of a narrow piston (not shown) in cylinder 258. When the piston rod 260 is extended the suction box is raised as seen in FIG. 22, and when the piston rod 256 is extended the suction box is lowered, as seen in FIG. 27.

The suction box is in its elevated position when the carriage is over the traveling caul plates and as it moves laterally toward and away from such position. When the carriage is over the magazine loading table 104, as seen in FIG. 22, a switch (not shown) is actuated as the carriage reaches its limit position to thereby cause lowering of the suction box toward the table 104. The suction box is lowered a variable amount depending upon the height of the piles of veneer sheets in the magazine positioned on the table 104. When the foraminous lower wall of the suction box approaches within a short distance of the uppermost sheets in the magazine, the sheets literally jump vertically upward due to the suction created in the box by the propeller 200, and are thereby caused to cling to the lower wall of the suction box in substantially the same arrangement and spacing that the sheets occupied in the magazine. When the sheets engage the surface of the foraminous wall they trip switch means (not shown) which reverses the action of the cylinder 258 to raise the suction box to its elevated position. When the suction box reaches its elevated position, a switch (not shown) is tripped to initiate return movement of the carriage to its position above the traveling web on the caul plates 52. The sheets, upon engaging the surface of the suction box, also actuate control means (not shown) to actuate the piston and cylinder means 226 which thereby causes the movable, large wall portion 216 to approach the narrow wall portion 214. Such movement shifts all of the veneer sheets engaging the foraminous surface into edgewise engagement with each other throughout and shifts the sheet adjacent the abutment means 228 into engagement with the abutment means from end to end thereof, thereby positioning the sheets in transverse alignment with web 80 in the final position they occupy when laid up as a ply, without substantial cracks between the various skiffs of the ply. In order to permit the large movable portion 216 to shift with respect to veneer skiffs which have already been brought to a halt by the abutment means and the edge-to-edge engagement of the skiffs in successive manner, there are provided a plurality of small rollers 264 mounted upon rods 266 fastened to the inner surface of the foraminous portion 216 and extending parallel to the beams 220, the surfaces of the rollers projecting a slight distance beneath the surface of the plate through the perforations of the plate. The rollers hold the major portions of the veneer skiffs slightly spaced from the surface of the foraminous wall so as to permit movement of the skiffs toward the abutment means 228, without materially lessening the vacuum grip holding the skiffs onto the suction box lower wall.

Figure 28:
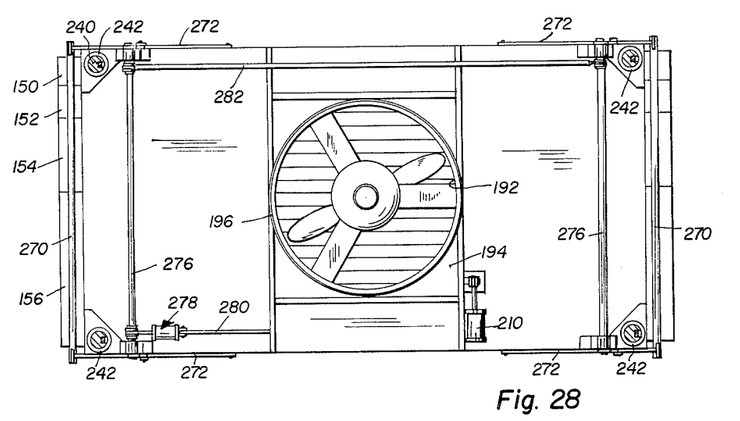
FIG. 28 is a horizontal section taken substantially along line 28—28 of FIG. 27.
Figure 29:
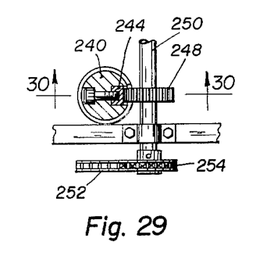
FIG. 29 is a partial horizontal section, on an enlarged scale, taken along line 29—29 of FIG. 27.
Figure 30:
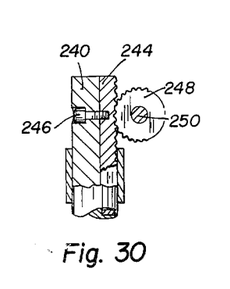
FIG. 30 is a vertical section taken substantially along line 30—30 of FIG. 29.
Figure 36:
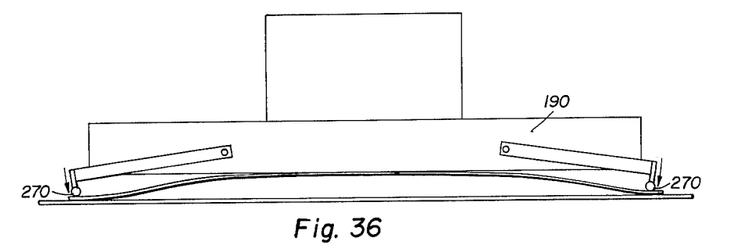
FIGS. 36 and 37 are schematic side views of the suction box illustrating the operation of the ejector means.
Figure 37:
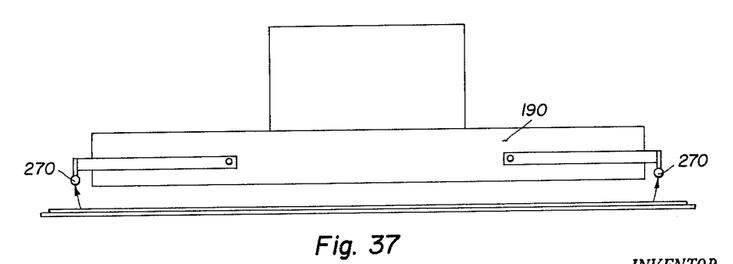

The suction box, holding the aligned, abutted skiffs, rests above the path of travel of the web, holding the veneer skiffs two or three inches above the previously positioned material, until means (not shown), sensing a space between adjacent caul plates, actuates means whereby the skiffs are positioned on the web 80, or preceding plies, in centered relationship above a caul plate, as follows: In order rapidly to move the ends of the skiffs downward the several inches which they must move, an ejector means is provided as follows: A transverse ejector rod 270 extends along each end wall of the suction box 190 in position to engage the projecting ends of the veneer skiffs (FIGS. 27 and 28). Each ejector rod is mounted upon a pair of levers 272 pivoted on the sides of the suction box and which are connected to upwardly extending links 274. The upper ends of the links are connected to cranks fixed to a pair of transversely extending rockshafts 276. One of the shafts is connected through a crank to a piston and cylinder device 278 mounted upon a bracket 280 extending from the damper cage 194. The opposite end of this shaft is connected through cranks and a link 282 to the other rockshaft, whereby both ejector rods 270 are raised and lowered in unison when the piston and cylinder device 278 is actuated. This device is double acting and automatically returned. Its action takes place when the dampers 202 start to close and is very rapid, so that before the vacuum is reduced materially to such an extent that the skiffs would fall freely with a fluttering motion which might cause them to overlap, they are stripped from the suction box, slightly bowing as the ends are pressed onto the traveling web, or preceding plies as the case may be, as illustrated in FIG. 36, and then springing into flattened condition as the ejector rods 270 return to their elevated position, as illustrated in FIG. 37. The action is so instantaneous that there is no need for interrupting the relatively slow travel of the conveyor means 70.

The crossband type of suction box 190A is provided with similar ejecting means, including a pair of longitudinally extending ejector rods 290 adapted to engage the ends of the fifty inch crossbands and place them in the same manner as previously described.

Automatic sequencing means (not shown) then causes the carriage to return to its outer position, the suction box to be lowered to pick up a succeeding ply and raised, the movable wall portion 216 being separated prior to the pickup of a succeeding ply and then brought back into engagement with the fixed wall portion, and the carriage returned to await the arrival of the next increment of the traveling web and plies in proper position. The movement of the conveyor 70 is so relatively slow compared to the rapidity of action of the carriage and suction box assembly that a single operator may watch all layup stations and have time to correct any mishap, such as will occasionally occur in spite of careful loading of the magazines, including the accidental placing of a scrap of veneer between skiffs in a magazine, or overlapping caused by an end of a skiff splitting and straddling one of the divider bars 132.

After the desired number of veneer plies have been assembled on the first traveling web, the second traveling web 108 is laid on top of them, and severing of the whole into assemblies on individual caul plates is accomplished by the water jet shear 110. The assemblies are then introduced into the press and consolidated into a board product. The process includes the pressing of the pack between imperforate, smooth-surfaced caul plates which are impervious to the passage of steam, the caul plates being heated to a temperature above the boiling point of water, but below the charring point of wood or the fibers employed, preferably in the range of about 275° F. to 350° F., while being subjected to sufficient pressure, usually in the range of thirty to fifty pounds per square inch, depending upon the number of platens in the stack press, to hold the veneer skiffs against edgewise shrinking across the grain, for sufficient length of time to drive the moisture from the veneer skiffs and fiber webs as steam, and to consolidate the pack into a smooth, fiber-skinned sheet of plywood. Of course, the same process may be used when omitting the fiber webs. The length of time that the pack remains in the press is variable, depending upon the moisture content of the wood to some extent, the number of plies, the speed of assembly to some extent, and upon the height of the stack press to some extent, in any event being sufficient time substantially to dry the veneer and set the adhesive, such as one-half to two hours. By substantial drying I mean anywhere from practically bone dry to less than about six or seven percent moisture content by weight. The result is a sheet of plywood having internal stresses and strains relieved by a sort of annealing action, since the steam softens the veneer sheets and permits the fibers thereof to rearrange themselves by slippage into stress-relieved condition. Also, the total area of product formed may be anywhere from six to eight percent larger than could be formed from the same amount of green wood in conventional manner by initially drying the veneer sheets. When the conventional drying occurs the skiffs shrink appreciably across the grain, so that it requires six to eight percent more wood to produce a given quantity of plywood. In the present process the veneer plies are held against such shrinkage by the pressure of the stack and the tendency to shrink is relieved by the creation of minute, closely spaced, hairline cracks throughout the veneer skiffs.

While I have herein stressed the formation of covered plywood having smooth surfaces, it is to be appreciated that one or both surfaces of the sheet may have a rough fiber surface formed by placing screens on the caul plates 52 prior to placing the first web thereon, or by affixing screens to the bottoms of the platens, or both. Also, plywood without fiber covers may be so formed, the wire marks being left for some purposes, or sandpapered away. In other words, the layup mechanism and process of the present invention are not to be limited to the formation of the preferred, covered plywood, smooth on both sides, but may be utilized to form any desired sheet incorporating veneer plies.

Figure 38:
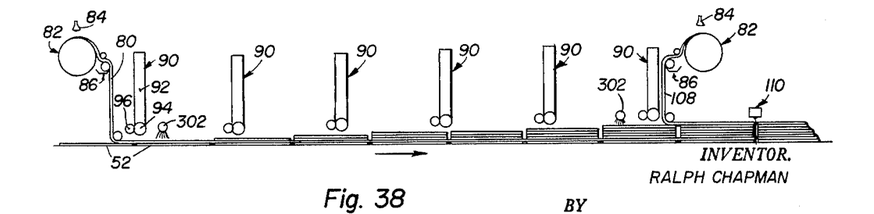
FIG. 38 is a schematic representation of a modified form of layup machine.

FIG. 38 schematically illustrates a modification of the plywood layup machine which is suitable for dry veneer sheets. In this machine the first web of fibrous material is formed in the same manner as previously described and laid down on the traveling series of caul plates. It may be preferable to use a powdered adhesive next to the fiber layer, in which case the adhesive would be applied by a powder applicator 90 as previously described. However, since the sheet of veneer which is to come in contact with the fiber ply would be dry and might not have sufficient moisture to plasticize the adhesive a light spray of water or other plasticizing liquid could be supplied thereto through a spray pipe 302 immediately prior to the web arriving at the first station where the first ply of veneer is laid down. The succeeding dry plies of veneer may have powdered adhesive applied thereto by means of powder applicators, with water or other plasticizing material supplied before or after applying the powder to the upper surface of each ply of veneer when protein adhesives are used. Resin adhesives do not need added water. Then, immediately prior to laying down the upper ply of moist fiber, the upper surfaces of the core assemblies may be moistened by means of a spray pipe 302, after which a final dusting of powdered adhesive may be laid down on the cores immediately prior to laying down the upper fiber web. The foregoing is to be taken as merely illustrative of many possible combinations of means whereby powdered adhesives, with or without plasticizing liquids, may be applied as desired.

While I have herein indicated that the fiber webs are preferably provided with a drying oil, with or without a pigment, it is to be appreciated that other materials may be applied to the webs in the same general manner, such other materials possibly being applied to the surfaces of the webs which lie innermost, next to the veneer sheets. Such materials may include vermicides, fungicides, resins, or others.

Having illustrated and described preferred embodiments of the present invention, it should be apparent to those skilled in the art that the same permits of many modifications in detail and arrangement. All such modifications as come within the true spirit and scope of the following claims are considered to be a part of my invention.

I claim:

1. A plywood layup machine comprising a suction box having a foraminous wall adapted to support a plurality of sheets of veneer in side by side relation to each other, abutment means along one edge of said suction box,
    said wall comprising a narrow, fixed portion adjacent said abutment means and a wide, movable portion normally spaced from said fixed portion,
    means to create a partial vacuum in said suction box whereby said sheets are caused to cling to said wall,
    and means to shift said movable portion toward said fixed portion whereby the sheets clinging to said wall are moved into edgewise abutment with each other throughout and the sheet adjacent said abutment means is moved into edgewise abutment with said abutment means throughout.

2. The construction set forth in claim 1 wherein said wall portions comprise plates of expanded metal.

3. The construction set forth in claim 1 wherein said movable wall portion comprises a smooth-surfaced metal sheet having perforations therethrough and a plurality of rollers having peripheral portions projecting through certain of said perforations.

4. The construction set forth in claim 1 wherein the adjacent edges of said wall portions are serrated in outline and complementarily interfit with each other.

5. A magazine for a plywood layup machine comprising a pallet including a floor and a pair of oppositely disposed walls rising from said floor,
    a plurality of divider members individually mounted on each of said walls for selective movement to positions projecting inwardly from said walls or retracted within said walls,
    and pivot means individually mounting said divider members for pivotal movement about vertical axes.

6. A plywood layup machine comprising suction pickup means for picking up a sheet of veneer,
    a pair of horizontally positioned ejector rods mounted on said pickup means so as to extend transversely across the ends of a sheet of veneer held thereby,
    means to break the vacuum in said pickup means whereby to release said sheet,
    and means rapidly to move said ejector rods downwardly as the vacuum is broken.

7. A plywood layup machine comprising a rectangular suction box including a lower wall surface against which a plurality of sheets of veneer may be held in edge-to-edge relation,
    a pair of ejector rods extending transversely of the opposed ends of said suction box across the ends of said sheets of veneer,
    means to break the vacuum in said suction box whereby to release said sheets of veneer,
    and means rapidly to project said ejector rods downwardly prior to the reduction of vacuum to such an extent that the sheets would fall freely.

References Cited by the Examiner

UNITED STATES PATENTS

| | | | |
|---|---|---|---|
| 1,315,737 | 9/1919 | Milmoe | 156—571 |
| 1,697,345 | 1/1929 | Chaudoir | 214—16.11 |
| 1,976,055 | 10/1934 | Woodward | 156—283 |
| 1,999,509 | 4/1935 | Merritt | 156—283 |
| 2,215,085 | 9/1940 | Schnitchen | 156—569 |
| 2,325,039 | 7/1943 | Chester | 312—50 |
| 2,520,628 | 8/1950 | Elsner | 156—571 |
| 2,716,497 | 8/1955 | Wahl et al. | 294—65 |
| 2,841,433 | 7/1958 | Pagdin et al. | 294—65 |
| 2,973,960 | 3/1961 | Buccicone | 271—74 |
| 2,992,152 | 7/1961 | Chapman | 162—104 |
| 3,018,001 | 1/1962 | Combs | 221—242 |
| 3,019,478 | 2/1962 | Erickson et al. | 18—4 |

EARL M. BERGERT, *Primary Examiner.*

R. I. SMITH, M. L. KATZ, *Assistant Examiners.*